UNITED STATES PATENT OFFICE.

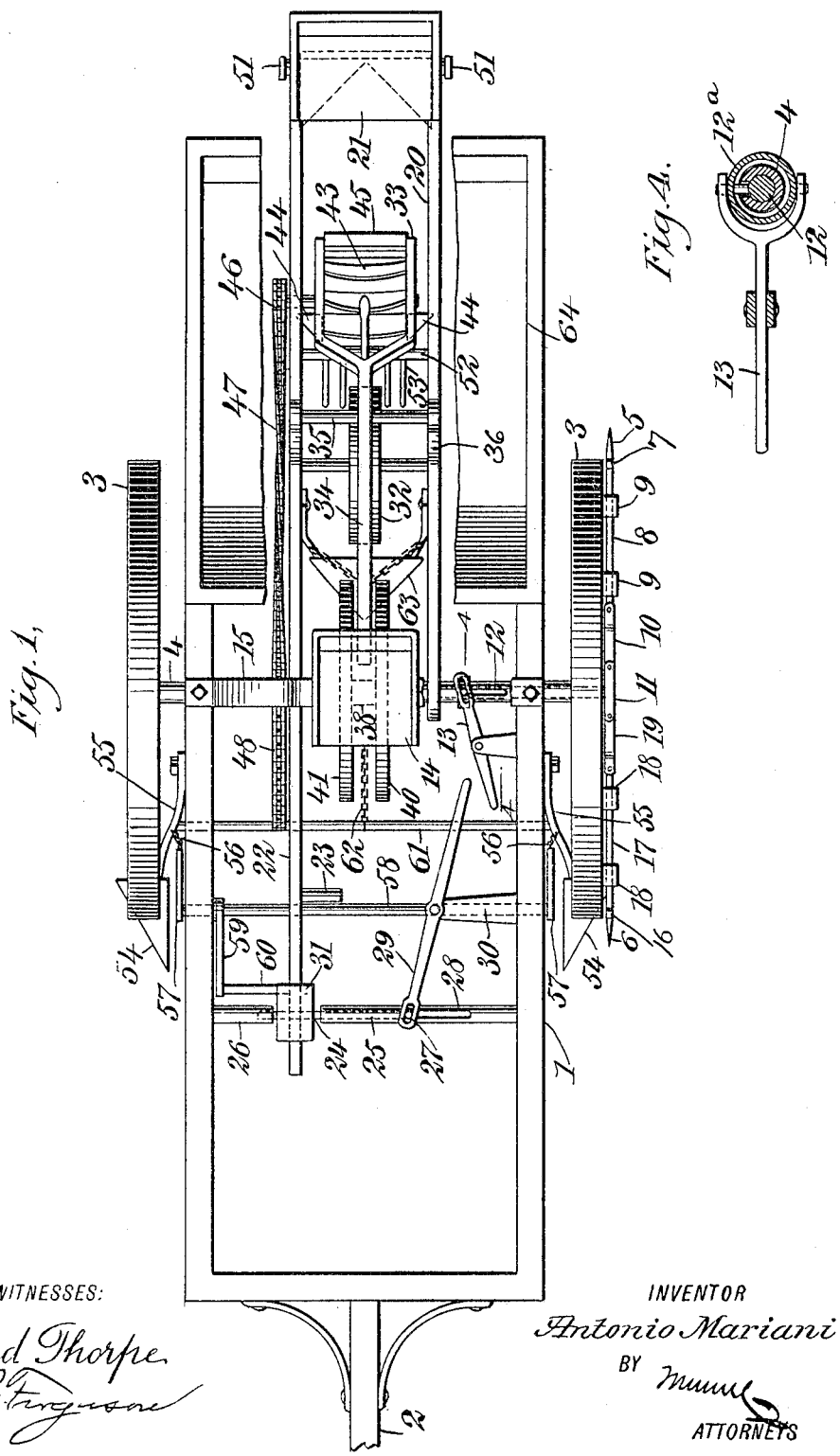

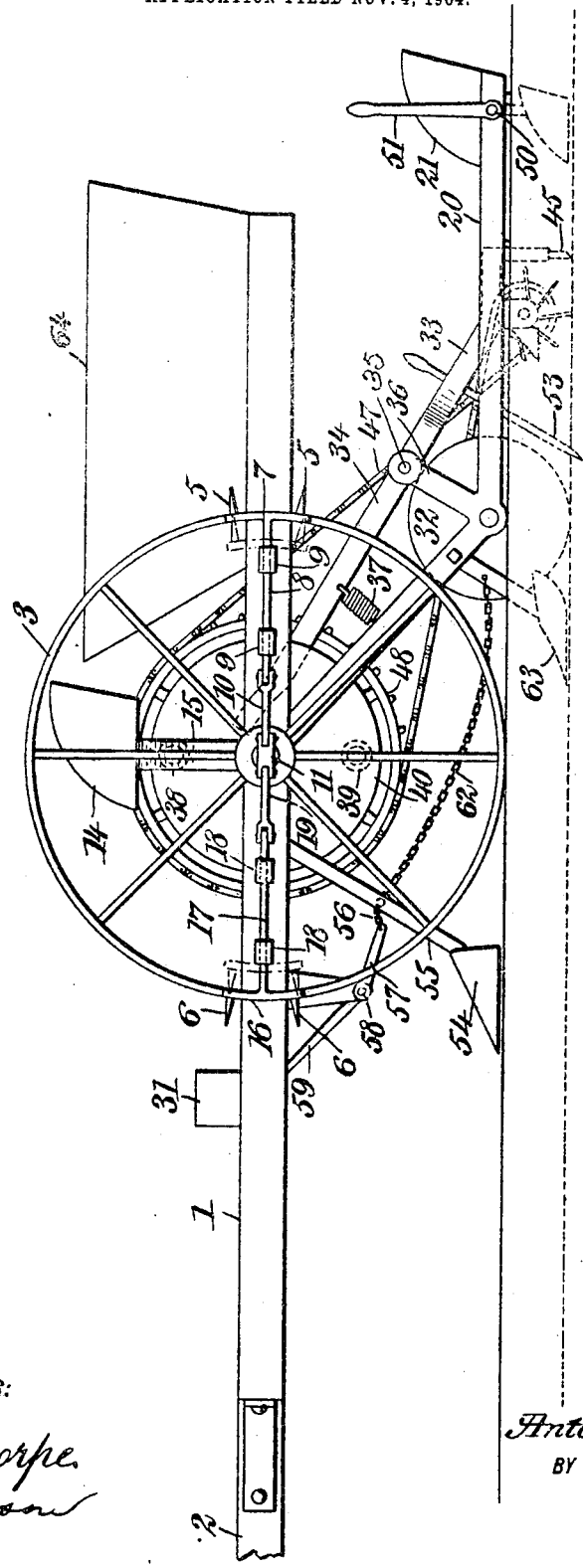

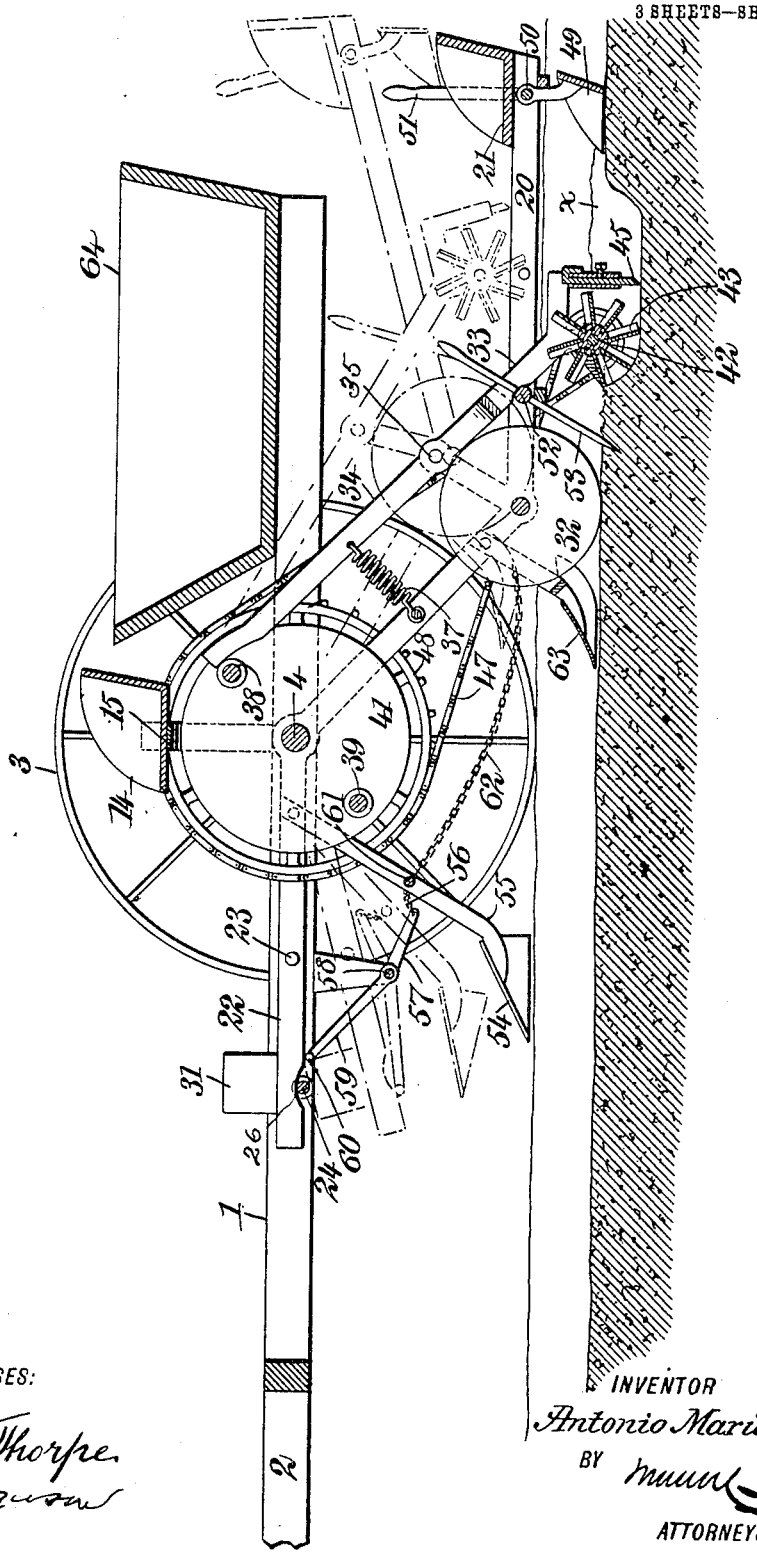

ANTONIO MARIANI, OF YAUCO, PORTO RICO.

CANE-PLANTER.

No. 798,612.  Specification of Letters Patent.  Patented Sept. 5, 1905.

Application filed November 4, 1904. Serial No. 231,416.

*To all whom it may concern:*

Be it known that I, ANTONIO MARIANI, a citizen of Porto Rico, and a resident of Yauco, Porto Rico, have invented a new and Improved Cane-Planter, of which the following is a full, clear, and exact description.

This invention relates to improvements in machines for planting sugar-cane, the object being to provide a planter of simple and comparatively inexpensive construction by means of which ground-excavations for receiving the shoots or lengths of cane may be quickly and evenly made and the dirt covered over the cane.

Other objects of the invention will appear in the general description.

I will describe a cane-planter embodying my invention and then point out the novel features in the appended claims.

Reference is to be had to the accompanying drawings, forming a part of this specification, in which similar characters of reference indicate corresponding parts in all the figures.

Figure 1 is a plan of a cane-planter embodying my invention. Fig. 2 is a side view thereof. Fig. 3 is a sectional elevation, and Fig. 4 is a sectional detail, showing a shifting mechanism employed.

The machine comprises a main frame 1, having a tongue 2 at its forward end to which draft-animals may be attached, and this main frame is mounted on wheels 3, the said wheels being attached to a shaft 4, having bearings in boxes secured to the frame. It may be here stated that in planting cane furrows are first made by a plow and then the excavations for the cane are made in these furrows. It is therefore necessary that the machine should be so arranged as to prevent any lateral slipping relatively to a furrow in which the excavations are being made. For this purpose I employ two pairs of spikes 5 6, adapted, when the machine is in operation, to be forced outward beyond the periphery of one of the wheels, so as to engage in the ground. When the machine is being moved, however, from place to place without operating, the said spikes are to be moved inward. The two spikes 5 are connected to a cross-head 7, from which a rod 8 extends, and is arranged to slide in keepers 9, attached to a spoke of the wheel, and from the inner end of said rod a link 10 extends to pivotal connection with a block 11, mounted on a rod 12, which extends through a tubular portion of the shaft 4, and on the inner end of this rod 12 is a pin passing through a slot in the shaft and engaging in a channel formed in a ring $12^a$, engaged by a shifting-lever 13, within easy reach of the driver on a seat 14, supported on a spring 15, attached to side bars of the main frame. The spikes 6 are connected to a cross-head 16, from which an actuating-rod 17 extends through keepers 18, mounted on a spoke of the wheel, and from the inner end of this rod 17 a link 19 extends to a connection with the block 11. By this arrangement when the block 11 is drawn inward or toward the wheel the spikes will be moved outward to the position indicated in full lines in Figs. 1 and 2. When the block 11 is forced outward, the drawing upon the links 10 and 19 will move the spikes inward of the wheel-periphery.

Mounted to swing on the axle 4 and extended rearward underneath the main frame is an auxiliary frame 20, and on the rear end of this auxiliary frame is a seat 21, upon which it is designed a boy may sit to place the shoots in the excavations, as will be hereinafter described. One of the side members of the auxiliary frame 20 has a forward extension 22, provided with a foot-piece 23, and when the machine is in operation this forward extension 20 rests normally on a locking-bolt 24, mounted to slide in a tubular cross-piece consisting of two spaced members 25 26, which are connected to the main frame. The portion of the rod 24 which passes in the tubular member 25 has a pin 27, which extends outward through a slot 28 formed longitudinally in said member and engages in a slot in a horizontally-moving shifting-lever 29, pivoted on a bracket 30. The forward extension 22 has mounted on it a counterweight 31, which when said forward extension is released from the bolt 24 will cause an upward movement of the rear portion of the auxiliary frame, so that the machine may be readily drawn over the ground without operating, as indicated in dotted lines in Fig. 3. This swinging movement may be assisted by the driver placing his foot on the foot-piece 23. The auxiliary frame rearward of the shaft 4 is supported by a roller 32, and having swinging connection with said auxiliary frame is a chopper-carrying frame 33. As here shown, this frame 33 has a forwardly and upwardly extended arm 34, mounted on a shaft 35, having bearings in uprights 36 on the auxiliary frame, and forward of the fulcrum-point of said arm there is a spring connection 37 between it and said auxiliary frame, whereby the rear portion of the chopper-carrying frame will be moved upward, as will be hereinafter mentioned. To move the chopper-carrying frame downward, the arm 34 is designed to be engaged successively by tappet-rods 38 39, attached to and extended across between spaced disks 40 41, rigidly attached to the axle 4. These rods 38 39 are diametrically opposite each other, and it is to be understood that while only two are shown a greater number may be employed, or, in fact, but one may be employed, without departing from the spirit of my invention.

Carried by the frame 33 is a shaft 42, mounted on which are radial ground-chopping-blades 43. As here shown, these blades are arranged at a slight tangent with relation to the axle or shaft and are curved from the center outward in both directions toward the shaft, so as to operate to throw the broken ground laterally. Carried by the frame 33 at each end of the chopping device are triangular smoothing-plates 44, which will serve to smooth the broken ground or spread it away slightly at the sides of the chopped-out cavity.

Rearward of the chopping device and carried by the frame 33 is a smoothing-plate 45, designed to smooth the bottom of the cavity $x$ in which the sticks of cane are to be placed.

On the shaft of the chopping device is a sprocket-pinion 46, from which a chain 47 extends to a sprocket-wheel 48, rigidly attached to the axle 4. This chain, as clearly shown in the drawings, is crossed, so that during the forward movement of the machine the chopping device will be rotated in the proper direction to throw the dirt upward and forward.

As a means for covering the dirt over the sticks in the excavations I employ a scraper 49, which is substantially V-shaped or has its sides divergent in a forward direction. This scraper 49 is mounted on a rock-shaft 50, having bearings in the side members of the frame 20, and extended upward from the opposite ends of the shaft 50 and along the ends of the seat 21 are actuating-levers 51, by means of which the boy on the seat may impart a rocking motion to the scraper to throw it against the ground or away from the ground.

Forward of the chopping device and mounted in a cross-bar 52, attached to the auxiliary frame, are scoring-rods 53, the sharpened lower ends of which are designed to engage slightly in the ground to break up any hardened surface that might appear.

I have before mentioned that it is necessary to provide means to prevent lateral slipping of the machine while in operation. It is, further, quite necessary that the machine shall travel on a practically level plane or, in other words, be prevented from tilting or jumping up and down at one side or the other, which might be caused by the wheels 3 engaging with rocks or stones or the roller 32 engaging with a stone. I therefore provide in front of the wheels and roller stone-clearing devices. Arranged forward of the wheels 3 and in line of movement therewith are triangular clearing-plates 54, the said plates being attached to arms 55, having swinging connection with the side members of the main frame, and from these rods or arms 55 chains 56 extend to connections with crank-arms 57, attached to a rock-shaft 58. Extended forward from this rock-shaft 58 is an arm 59, from which a tappet-arm 60 extends laterally and normally engages under the extension 22 of the auxiliary frame. By this arragement when the said extension is lowered, as hereinbefore mentioned, to raise the rear portion of the auxiliary frame the rock-shaft 58 will be actuated to raise the plates 54 a suitable distance above the ground to prevent their engaging with obstacles when the machine is drawn from place to place and not in operation. From a cross-rod 61, attached to the arms or rods 55, extends a chain 62, which connects with a triangular clearing-plate 63 forward of the roller 32 and designed to force stones or the like laterally out of the line of movement of said roller. When the clearing-plates 54 are raised, as above mentioned, the plate 63 will also be raised, as its supporting-arms have pivotal connection with the auxiliary frame. Arranged on the main frame at a convenient point above the seat 21 is a receptacle 64 for the sticks of cane to be planted.

In the operation the attendant will take from the receptacle 64 the desired number of sticks to be planted and hand the same to the boy on the seat 21. As the machine moves forward and as the tappets 38 and 39 engage with the arm 34 the rotary chopping device will be forced downward and by its rotary movement will cut a short trench; but as soon as a tappet 38 or 39 leaves the arm the spring 37 will move the chopping device upward to the position indicated in dotted lines in Fig. 3, where it will remain until the machine reaches a point for another trench or excavation. The boy on the seat 21 will place the cane-sticks in the formed trench and then by operating the scraper 49 will force the dirt over the same. It will be seen that a machine embodying my invention, so far as preparation of the ground for planting is concerned, is practically automatic and may be operated by very little manual exertion.

Having thus described my invention, I claim as new and desire to secure by Letters Patent—

1. A planter comprising a wheel-mounted main frame, a vertically-swinging frame therein, a chopper mounted to rotate in said swinging frame and comprising longitudinally-disposed blades arranged at a slight tangent with relation to the axis of the chopper, and means actuated from the machine-axle for rotating the chopper.

2. A planter comprising a wheel-mounted main frame, a frame having swinging relation to the main frame, a rotary chopper mounted in the swinging frame, and a scraper carried by the swinging frame rearward of the chopper.

3. In a planter, a wheel-mounted main frame, a frame having vertical swinging relation to the main frame, a rotary chopper carried in the swinging frame, a scraper carried in the swinging frame rearward of the chopper, and triangular plates at the ends of the chopper.

4. In a planter, a wheel-mounted main frame, an auxiliary frame mounted to swing on the axle of the machine, a tappet-rod-carrying disk mounted on the axle, a chopper-carrying frame having swinging connection with the auxiliary frame, and an arm extended forward from said chopper-carrying frame for engaging with the tappet-rod.

5. In a planter, a main frame, an axle on which the main frame is supported, wheels on the axle, an auxiliary frame mounted to swing on the axle, a supporting-roller therefor, and a chopper-carrying frame having swinging connection with the auxiliary frame.

6. In a planter, a wheel-mounted main frame, an auxiliary frame mounted to swing on the axle of the machine, a seat on the rear end of said auxiliary frame, divergent plates mounted to swing underneath said seat, a chopper-carrying frame having swinging connection with the auxiliary frame, scoring devices carried by the auxiliary frame forward of the chopper-carrying frame, a chopper mounted to rotate in said chopper-carrying frame, means operated from the axle of the machine for causing such rotation, and means for raising and lowering said chopper-carrying frame with relation to the ground.

7. In a planter, a wheel-mounted main frame, an auxiliary frame mounted to swing on the axle of the machine, the said auxiliary frame having a forward extension, a counterbalance on said extension, a movable supporting device upon which the said extension is designed to rest when the machine is in operation, and a vertically-swinging chopper-carrying frame mounted in the auxiliary frame.

8. In a planter, a wheel-mounted main frame, a cane-receptacle on said main frame, an auxiliary frame mounted to swing on the axle of the machine, a seat at the rear end of said auxiliary frame, a covering device mounted to swing underneath said seat, a chopper-carrying frame having vertical swinging connection with the auxiliary frame, a spring for moving said chopper-carrying frame in one direction, and means for automatically moving it in the other direction.

9. A cane-planter comprising a wheel-mounted main frame, an auxiliary frame mounted to swing on the machine-axle, the said auxiliary frame being extended rearward from the axle, a covering device carried by said auxiliary frame, a chopper-carrying frame having vertical swinging connection with the auxiliary frame, an arm extended upward from said chopper-carrying frame, spaced disks secured to the axle of the machine, and rods extended between said disks for engaging with said arm to move the chopper-carrying frame in one direction.

In testimony whereof I have signed my name to this specification in the presence of two subscribing witnesses.

ANTONIO MARIANI.

Witnesses:
   JNO. M. RITTER,
   C. R. FERGUSON.